G. L. C. EARLE.
APPARATUS FOR RETURNING WATER OF CONDENSATION TO BOILERS, &c.
APPLICATION FILED JULY 13, 1914.
1,121,339.
Patented Dec. 15, 1914.
2 SHEETS—SHEET 1.
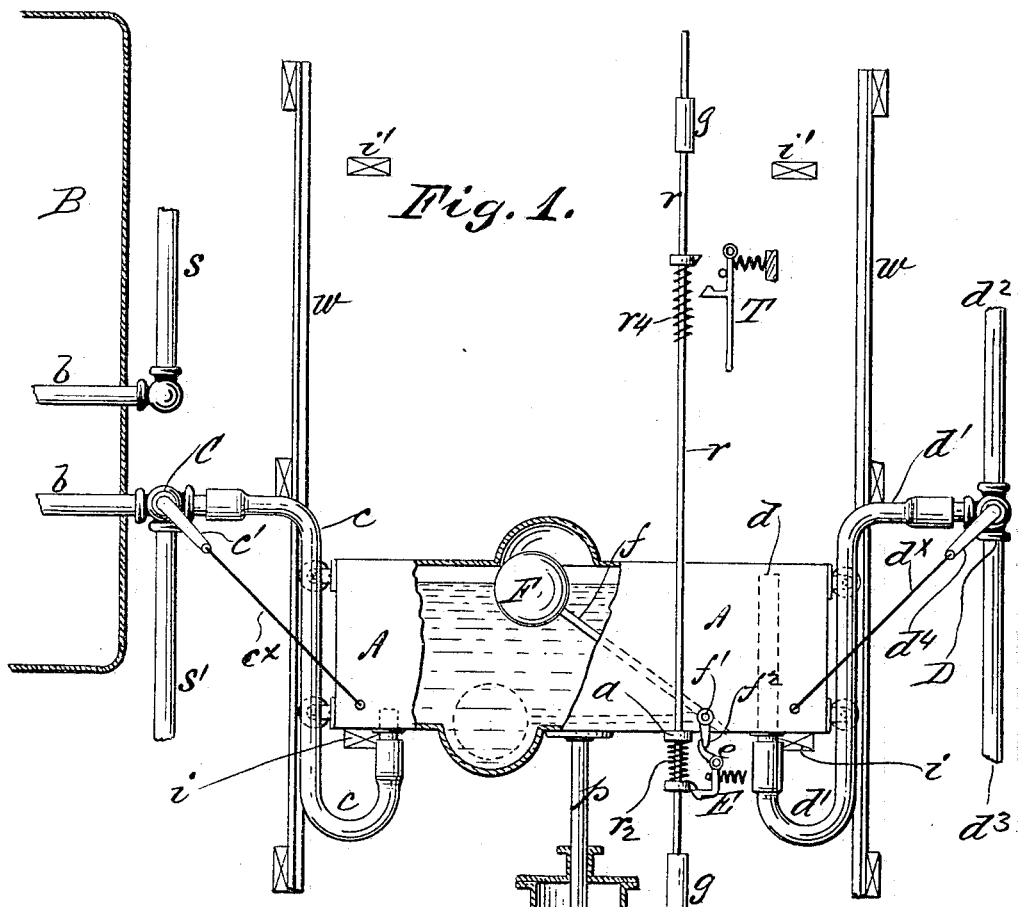
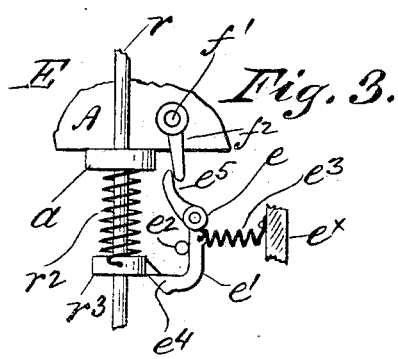

G. L. C. EARLE.
APPARATUS FOR RETURNING WATER OF CONDENSATION TO BOILERS, &c.
APPLICATION FILED JULY 13, 1914.
1,121,339.
Patented Dec. 15, 1914.
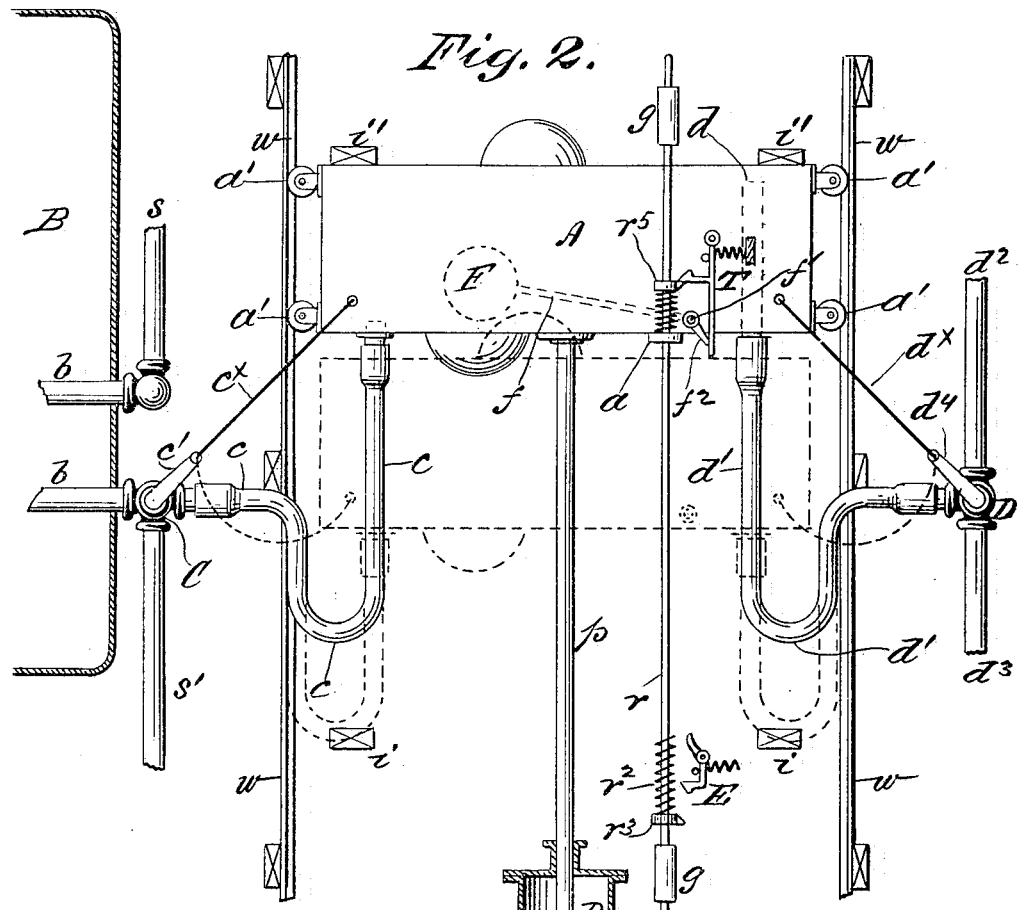
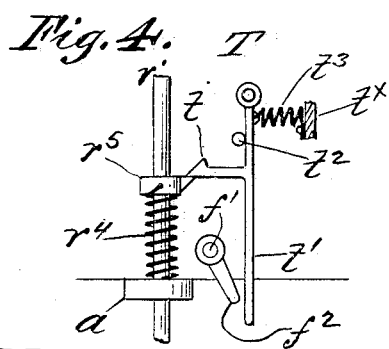

UNITED STATES PATENT OFFICE.

GUYON L. C. EARLE, OF FORREST HILLS, NEW YORK.

APPARATUS FOR RETURNING WATER OF CONDENSATION TO BOILERS, &c.

1,121,339.                Specification of Letters Patent.     Patented Dec. 15, 1914.

Application filed July 13, 1914. Serial No. 850,628.

*To all whom it may concern:*

Be it known that I, GUYON L. C. EARLE, a citizen of the United States, and a resident of Forrest Hills, in the county of Queens and State of New York, have invented certain new and useful Improvements in Apparatus for Returning Water of Condensation to Boilers, &c., of which the following is a specification.

The object of my invention is the provision of simple but effective means whereby water of condensation, as for instance from a system of heating by steam, may be automatically and economically returned to the boiler.

The invention consists in the specific construction and arrangement of parts herein described and claimed, a distinguishing feature being the collection of the water of condensation in a tank which is intermittently raised and lowered by fluid pressure under the control of a float in the tank itself, which float, when the tank is full of water of condensation, or approximately so, applies the fluid pressure to raise the tank sufficiently to admit of the return of the water of condensation to the boiler by gravity, and which float when the tank is empty, or nearly so, releases the fluid pressure so that the tank descends by gravity to the receiving level, to again collect the water of condensation, when the cycle of operation is repeated, and so on continuously.

Another distinguishing feature of my invention is the utilization of the reciprocating motion of the tank itself to shift the valves by which communication is established alternately with the drip and the atmosphere, and with the boiler pressure,—all as hereinafter more fully set forth, my invention also including certain minor details.

In the accompanying drawings, Figure 1, is a diagrammatic representation of the parts essential to the practical operation of my invention, the collecting tank for the water of condensation being shown in its lowest or receiving position. Fig. 2, is a similar view representing the collecting tank and connections in the highest or discharging position. Fig. 3, is a detail view of the lower trip mechanism. Fig. 4, is a detail view of the upper trip mechanism.

The tank A, for the reception of the water of condensation is supported primarily on the upper end of a piston rod $p$, attached to a piston P, which is situated in the hydraulic cylinder H, the lower part of which latter is connected through the medium of the three-port valve $h$, with a water pressure supply pipe $h'$, and also with a discharge pipe $h^2$, said three-port valve $h$, being interposed between said pressure supply pipe $h'$, the discharge pipe $h^2$, and the lower part of the cylinder H.

B, represents a stationary water heating tank in which is situated a heating coil or coils $b$, communicating with the steam boiler through the steam supply pipe $s$, and also with the return pipe $s'$, between which and the coil $b$, is interposed a three-port valve C, which is also in communication through the flexible pipe $c$, with the lower portion of the collection tank A.

$d$, is a stand pipe in the condensation-collecting tank A, the lower end of said stand pipe $d$, communicating by a flexible connection $d'$, with a three-port valve D, which latter also connects with the pipe $d^2$, communicating with the steam space in the boiler, and with the air pipe $d^3$, communicating with the atmosphere. These valves C, D, are actuated through the medium of the drip-collecting tank A, by any suitable means whereby they may be reversed or tripped at appropriate times during the movement of the tank. A simple method shown in the drawings consists in linking the valve levers $c'$, and $d^4$, respectively with the tank A, by means of flexible connections $c^x$, and $d^x$, the length of the connections being such that near the termination of each stroke in the reciprocatory movement of the tank the valve stems are turned sufficiently to shift the ports, as hereinafter set forth,— the slack of said connections $c^x$, and $d'$, during the medial reciprocal movement of the tank preventing the disturbance of the valve stems in the interim, and then only within prescribed limits near the end of each stroke in either direction. This slack is illustrated by dotted lines in Fig. 2.

The valve lever $h^x$, of the three-port valve $h$, is pivotally connected by a link $r'$, with a vertical rod $r$, passing through and supported in stationary guide sleeves $g$, $g$. The rod $r$, also passes through an eye or lug $a$, secured to the exterior of the collecting tank A. One end of a coiled spring $r^2$, is attached to a collar $r^3$, on the rod $r$, the free end of the spring extending upward; and in like manner another coiled spring $r^4$, is attached to the collar $r^5$, on the rod $r$, but in the latter case the spring is inverted, or extends downward.

E, the lower tripping mechanism, consists of a rock-lever $e$, pivotally supported upon a stationary part, the lower arm $e'$, of said lever resting normally against a stop $e^2$, by reason of the action of a push spring $e^3$, bearing against said arm $e'$, and interposed between it and a stationary part represented by $e^x$. The lower arm $e'$, of said rock-lever $e$, is formed with a shoulder $e^4$, the under side of which is beveled to facilitate the rocking back of the lever $e$, when subjected to pressure from below. This device is shown on a larger scale in Fig. 3, although I do not restrict myself thereto, as any suitable or well known trip mechanism may be used for the purpose. The same remark is applicable to the upper trip mechanism T, which may consist, as shown in detail in Fig. 4, of a trip pawl $t$, rock-lever $t'$, stop $t^2$, and push spring $t^3$, interposed between said lever $t'$, and a stationary part represented by $t^x$.

A float F, and the long arm $f$, of its lever are mounted inside the tank A, the fulcrum $f'$, protruding through the side of the tank (the bearing being suitably packed) and having rigidly attached to it the short or trip arm $f^2$, of the lever, which latter is of the first order. This trip arm $f^2$, is inclined with relation to the long arm $f$, of the lever and with relation to the trip mechanism E, and T, in such manner as to engage alternately with the latter under certain conditions, illustrated approximately in Figs. 1 and 2. In other words the operation of the apparatus may be described as follows: beginning with the parts in the relative positions shown in Fig. 1, with the drip-collecting tank A, in its lowest position, resting against the lower stationary supports $i$, $i$. In attaining this position in its descent between the laterally supporting guide ways $w$, $w$, with which the rollers $a'$, $a'$, contact, the receiving tank A, through its flexible connections $c^x$, $d^x$, has shifted the stems of the valves C, and D, just prior to contacting with the lower supports $i$, $i$. As a result the water of condensation can enter from the condenser coil $b$, through the flexible pipe $c$, into the bottom portion of the tank A, connection with the boiler through the return pipe $s'$, being shut off, and the interior of the tank being open to atmospheric pressure through the stand pipe $d$, flexible connection $d'$, valve D, and air pipe $d^3$. Also just before the completion of the descent of the receiving tank A, the eye bracket $a$, on the latter has encountered the upper free end of the spring $r^2$, compressing it against the collar $r^3$, which with the rod $r$, is sustained by the shoulder $e^4$, of the rock-lever $e$ as shown in Figs. 1 and 3. It is understood of course that the tank A, has descended by reason of the release of the water from below the piston P, in the cylinder H. Under these conditions when the water of condensation collects in the tank A, sufficiently to raise the float F, a prescribed distance, the trip arm $f^2$, of the float lever will contact with the upper arm $e^5$, of the lever $e$, rocking it against the resistance of the spring $e^3$, thereby releasing the collar $r^3$, and the rod $r$, and allowing the spring $r^2$, to impel the said rod $r$, downward to shift the stem of the valve $h$, by which means communication with the discharge pipe $h^2$, is shut off and communication between the lower part of the cylinder H, and the water pressure pipe $h'$, is established. As a result the piston acting through the rod $p$, will raise the tank A, with the water of condensation contained therein. When the tank has nearly reached the limit of its upward journey the flexible connections $c^x$, $d^x$, will reverse the valves C and D, shutting off the drip $b$, $c$, and air pipe $d^3$, and admitting steam pressure from the boiler through the pipes $s'$, and $d^2$, so that, the pressure being balanced, the water of condensation will return by gravity through the pipe $s'$, to the boiler. At the same time, or just before the completion of the upward movement of the tank A, the eye bracket $a$, on the tank A, has encountered the lower free end of the spring $r^4$, and compressed it so that by the time the tank A, reaches the upper rests $i'$, $i'$, sufficient energy has been stored in said spring $r^4$, to effect the upward thrust of the rod $r$, when the collar $r^5$ is released by the pawl $t$. This is accomplished when the discharge of the water of condensation lowers the float F, until the trip arm $f^2$, contacts with the lower end of the rock-lever $t'$, rocking it against the resistance of the spring $t^3$, and retracting the pawl $t$. The effect of the upward thrust of the rod $r$, is to shift the valve $h$, so that the water pressure is shut off, and the discharge opened, when the piston P, tank A, &c. descend to complete the cycle of operation. As the rod $r$, is thrust upward the collar $r^3$, pushes past the pawl $e^4$, which yields before it; and in like manner during the down thrust of the rod the collar $r^5$, pushes past the pawl $t$, against the resistance of the spring $t^3$, so that the whole operation of the apparatus is automatic, and continuous, dependent entirely upon, and actuated by, the supply of water of condensation. The advantage of this automatic system of raising the water of condensation and returning the same to the boiler by aid of gravity, as compared with the prior or existing methods, is that it is simple, is less expensive to install, is more reliable in operation, and costs less to operate than the loss which would be involved if the water of condensation ran to waste,—the main saving being represented by the difference in temperature between the water of condensation returned to the boiler and the temperature of its feed water supply.

I have herein illustrated and described hydraulic means for raising and lowering the water of condensation tank, meaning to include thereby any suitable fluid pressure, not necessarily liquid, as may be found most expedient or convenient in practice.

I have also indicated the use of a simple form of three-port valve for effecting the necessary changes, although I do not wish to limit myself thereto,—a distinctive feature of my invention in this respect being the utilization of the reciprocatory motion of the condensation-collecting tank itself as a means whereby suitable valves are operated to effect an automatic cycle of operations.

Furthermore I have herein for convenience of illustration described my apparatus as connected with a steam generator, although my invention is applicable to other uses in which the saving and utilizing of the water of condensation is a desideratum.

What I claim as my invention and desire to secure by Letters Patent is,—

1. In apparatus of the character designated, the combination of a fluid pressure cylinder, piston and rod, a sealed tank supported on said piston rod, means controlled by said tank whereby fluid pressure is applied to and released from said cylinder to raise and lower the tank, means controlled by the said tank whereby its interior is alternately put in communication with the atmosphere and a water-of-condensation drip supply and then subjected to steam pressure to effect the discharge of said water of condensation from the tank, for the purpose set forth.

2. In apparatus of the character designated, the combination of a fluid pressure cylinder, piston and rod, a sealed drip tank supported on said piston rod, flexible conduits connecting said tank with reversing valves, means controlled by said tank whereby fluid pressure is alternately applied to and released from said cylinder to raise and lower the said tank, and means actuated by said tank for operating said reversing valves, whereby water of condensation is alternately admitted to said tank and discharged therefrom, for the purpose set forth.

3. In apparatus of the character designated, the combination of a fluid pressure cylinder, piston and rod, a sealed tank supported on said piston rod, reversing valve mechanism for alternately admitting fluid pressure to and releasing it from said cylinder to raise and lower the tank, a valve rod controlling said valve mechanism, trip mechanism connected therewith, a float and float lever carried by said tank and arranged to automatically actuate said trip mechanism by means of the water of condensation present in the tank, flexible conduits connecting said tank with reversible valve mechanism for effecting the collection of drip in the tank and its discharge therefrom by means of steam pressure, and means connected with the tank whereby the motion of the latter is utilized in reversing said last mentioned valve mechanism, for the purpose set forth.

4. In apparatus of the character designated, the combination of a hydraulic cylinder, piston and rod, a sealed drip tank supported on said piston rod, a three-port valve communicating with said tank, with a steam boiler pipe, and with a pipe for the delivery of water of condensation, another three-port valve communicating with said tank, with a boiler pipe, and with the atmosphere, a valve controlling the admission and discharge of water to and from the hydraulic cylinder, a float in said tank, and means controlled by said float for automatically and alternately reversing all three of said valves for the purpose set forth.

5. In apparatus of the character designated, the combination of a hydraulic cylinder, piston and rod, a sealed drip tank supported on said piston rod, a three-port valve communicating with said tank, with a steam boiler pipe and with a pipe for the delivery of water of condensation, a flexible connection between the stem of said valve and said tank, another three-port valve communicating with said tank, with a steam boiler pipe and with the atmosphere, a flexible connection between the stem of said valve and said tank, a valve for controlling the admission and discharge of water to and from the hydraulic cylinder, a slidable rod pivotally connected with the stem of said valve, springs on said rod adapted to be compressed by the movement of the said tank, a float in said tank, and trip mechanisms actuated by said float to release the springs and rod to control the inlet of water to and its discharge from the hydraulic cylinder.

GUYON L. C. EARLE.

Witnesses:
Geo. Wm. Miatt,
Dorothy Miatt.

Copies of this patent may be obtained for five cents each, by addressing the "Commissioner of Patents, Washington, D. C."